US011990716B2

(12) United States Patent
Machate

(10) Patent No.: US 11,990,716 B2
(45) Date of Patent: May 21, 2024

(54) ELECTRIC UNIT HAVING GROUPS OF CONTACTS THAT DIFFER IN HEIGHT MAKING CONTACT WITH DIFFERING LINES OF A BUSBAR WITHIN MOUNTING RAILS

(71) Applicant: ZUMTOBEL LIGHTING GMBH, Dornbirn (AT)

(72) Inventor: Andreas Machate, Wangen im Allgäu (DE)

(73) Assignee: Zumtobel Lighting GmbH, Dornbirn (AT)

(*) Notice: Subject to any disclaimer, the term of this patent is extended or adjusted under 35 U.S.C. 154(b) by 0 days.

(21) Appl. No.: 17/765,676

(22) PCT Filed: Oct. 1, 2020

(86) PCT No.: PCT/EP2020/077503
§ 371 (c)(1),
(2) Date: Mar. 31, 2022

(87) PCT Pub. No.: WO2021/069297
PCT Pub. Date: Apr. 15, 2021

(65) Prior Publication Data

US 2022/0385011 A1 Dec. 1, 2022

(30) Foreign Application Priority Data

Oct. 8, 2019 (DE) ..................... 10 2019 126 945.8

(51) Int. Cl.
*F21V 21/35* (2006.01)
*H01R 25/14* (2006.01)

(52) U.S. Cl.
CPC ........... *H01R 25/142* (2013.01); *F21V 21/35* (2013.01)

(58) Field of Classification Search
CPC ..... H01R 25/142; H01R 25/162; F21V 21/35; F21S 4/20
See application file for complete search history.

(56) References Cited

U.S. PATENT DOCUMENTS 8,206,001 B2 * 6/2012 Piepgras ................. F21V 21/35 362/373
8,888,512 B2 * 11/2014 Hoffmeister ......... H01R 25/142 439/121

(Continued)

FOREIGN PATENT DOCUMENTS

EP 2151899 2/2010
JP 2012010482 1/2012

(Continued)

OTHER PUBLICATIONS

Zumtobel Lighting Inc. Tecton Trunking for Tecton System—Installation Instructions—Individual & Continuous p. 10 of 11 (Year: 2015).*

(Continued)

*Primary Examiner* — Vanessa Girardi
(74) *Attorney, Agent, or Firm* — Andrus Intellectual Property Law, LLP

(57) ABSTRACT

The invention relates to an electric unit for connecting to a DIN rail (50), having means for contacting the lines (70) of a busbar (60), said means comprising a rotatable contacting element (30, 40, 50), the outer circumference of which is equipped with contacts (32, 42, 52, 53, 62, 63). A first group of contacts (32, 52, 62) and a second group of contacts (42, 53, 63) are provided, wherein the contacts of the first group are arranged so that, when the contacting element (30, 40, 50) is rotated they contact contact lines (70) extending in a first place (A1), and the contacts of the second group are arranged so as to contact lines extending in a second plane (B1).

7 Claims, 9 Drawing Sheets

(56) References Cited

U.S. PATENT DOCUMENTS

| | | | |
|---|---|---|---|
| 2018/0224104 | A1 | 8/2018 | Bernard et al. |
| 2019/0056073 | A1 | 2/2019 | Ulloa et al. |

FOREIGN PATENT DOCUMENTS

| | | |
|---|---|---|
| WO | 2001091250 | 11/2001 |
| WO | 2017007420 | 1/2017 |

OTHER PUBLICATIONS

PCT/EP2020/077503, International Search Report and Written Opinion dated Jan. 13, 2021, 14 pages and English Translation, 6 pages.
Tecton Trunking for Tecton System, Installation Instructions, Zumtobel Lighting, Inc. Jun. 9, 2022, 11 pages.
Screen captures from YouTube video clip entitled "Tecton Installation Video", 9 pages, uploaded on Jul. 24, 2023 by user "ewilliams". Retrieved from Internet: https://www.google.com/search?q=zumtobel+TECTON+&rlz=1C1GCEA_enUS1064US1064&ei=opi-ZMLHKq-F0PEP7_-M-AY&ved=0ahUKEwjCoKKk1KeAAxWvAjQIHe8_A28Q4dUDCBA&uact=5&oq=zumtobel+TECTON+&gs_Ip=Egxnd3Mtd216LXNIcnAiEHp1bXRvYmVsIFRFQ1RPTiAyBRAAGIAEMgUQABiABDIFEAAYgAQyBRAAGIAE.

* cited by examiner

ELECTRIC UNIT HAVING GROUPS OF CONTACTS THAT DIFFER IN HEIGHT MAKING CONTACT WITH DIFFERING LINES OF A BUSBAR WITHIN MOUNTING RAILS

CROSS-REFERENCE TO RELATED APPLICATION

The present application is the U.S. national stage application of international application PCT/EP2020/077503 filed Oct. 1, 2020, which international application was published on Apr. 15, 2021 as International Publication WO 2021/069297 A1. The international application claims priority to German Patent Application 10 2019 126 945.8. filed Oct. 8, 2019.

FIELD OF THE INVENTION

The present invention relates to an electric unit, for example a luminaire, which is provided for connecting to a mounting rail, which has an elongated mounting rail profile, in which at least one busbar is arranged with longitudinally extending, contactable lines. Furthermore, the present invention relates to a contacting element for such an electric unit as well as a light strip system.

BACKGROUND OF THE INVENTION

Mounting rails with a mounting rail profile as well as a busbar retained in the mounting rail profile are known from the prior art and are used, for example, to implement elongated so-called light strip systems. A known light strip system is sold by the Applicant under the name "TECTON" and is characterized in that luminaires or other electric units can be flexibly positioned on the mounting rail over the entire length of the system. This is made possible by the fact that, due to a special mounting of the lines of the busbar, they are accessible to the consumers over the substantially entire length of the light strip system, so that contacting of the lines can occur not only at fixed predetermined positions but rather at any desired location.

FIGS. 10 and 11 show views of such a light strip system as is known, for example, from WO 2001/091250 A1, wherein FIG. 10 shows a cross-sectional view of the light strip system with the luminaire arranged thereon, and FIG. 11 shows the part of a luminaire to be connected to the light strip system that is relevant for the contacting.

It can be seen that in this known light strip system 100, an elongated mounting rail profile 101, which is U-shaped and opens downwardly in cross-section, is used, and, together with the two lateral walls 102 and the upper connecting wall 103, an elongated receiving chamber is defined, which opens towards the bottom. A busbar 110, 120 is then arranged on the inner faces of both lateral walls, which respectively comprises a plurality of longitudinally extending wires or lines 111, 121 arranged in elongated channels of a line receiving structure 112, 122 consisting of an insulating material. The channels 112, 122 provide a secure mounting of the lines 111, 121 and are designed to open towards the internal space of the mounting rail profile 101.

A luminaire 130 to be connected to the light strip system 100 then comprises at least one rotatably mounted contacting element 135, as can be seen in FIG. 11 in particular. To connect the luminaire 130, it is attached from the bottom to the mounting rail profile 101, wherein the contacting element 135 is inserted into the mounting rail profile 101 and subsequently rotated by approximately 45°. The rotation of the contacting element 135 causes the laterally projecting latch flanges 105 to mechanically engage the mounting rail profile 101. Contacts 136 arranged on the contacting element 135 are designed to be outwardly pivoted laterally by rotation and then engage, as shown in FIG. 10, in the receiving channels 112, 122 of the busbars 110, 120 in order to contact the respective lines 111, 121.

In the light strip system shown in FIGS. 10 and 11, the lines 111, 121 of the busbars 110, 120 are arranged such that they overlap one another in parallel in a vertical plane. Likewise, the contacting element 135 is also designed such that the individual contacts 136 provided for contacting one of the two busbars 110, 120 are lined up in a common plane one above the other, wherein the position of a contact 136 corresponds to a (height) position of a line 111, 121. In the illustrated case, contacts 136 are arranged on both sides of the contacting element 135 in order to be able to contact the busbars 110, 120 positioned on both lateral walls 102 of the mounting rail profile 101. Due to the fact that the contacts 136 can be vertically displaced with their contact housing and the cable connected thereto with respect to the contacting element 135, they can be locked according to the position of a desired line 111, 121 and then contact the corresponding line 111, 121. This allows a phase selection as well as a selection of the neutral conductor.

While it would be possible in principle to guide the lines of the busbars relatively close to one another and, despite everything, to comply with the corresponding standard requirements for so-called creep distances, the individual contacts, including their insulation or housing, require a certain design space in order to be manufactured and used in a meaningful manner. The space requirement of the contacts is greater than that of the lines of the busbar, so that the distance between the lines of a busbar must therefore be matched to the configuration of the contacts of the contacting element. Ultimately, this results in the lines having a distance from one another that is greater than would actually be required with respect to the corresponding standard.

The underlying problem of the present invention is to provide a possibility for arranging significantly more lines in the same available space within a mounting rail profile, wherein, despite everything, contacting of all lines is to be possible. In particular, a possibility for designing electric components is to be provided so that they can efficiently contact closely adjacent lines of a busbar.

SUMMARY OF THE INVENTION

The problem is solved by an electric unit and a contacting element as described herein.

The solution according to the invention assumes a busbar in which the lines do not all extend together in one plane parallel to one another, but instead an alternating arrangement of the lines is provided in such a way that they alternately extend in two planes spaced apart from one another but still aligned parallel to one another. Correspondingly designed busbars are already generally known from the prior art, wherein, however, in the case of a very close guiding of the lines, difficulties arise in contacting them.

According to the present invention, it is therefore proposed that the electric unit, which comprises a plurality of contacts for contacting the lines of the busbar, is designed in such a way that there is a first group of contacts as well as a second group of contacts, wherein the contacts of the first group are arranged with respect to an axis of rotation of a rotatable contacting element such that they are outwardly pivoted by rotation such that they contact the lines of the busbar extending in a first plane, while, by contrast, the arrangement of the contacts of the second group with respect to the axis of rotation of a contacting element is such that they are outwardly pivoted by rotation such that they contact the lines of the busbar extending in a second plane.

According to the present invention, the two contact groups are thus supported in different ways, which means that they no longer have to be arranged vertically directly above one another, as in the prior art. This offers the possibility of arranging the entirety of the contacts with smaller vertical spacing to one another, so that even if the lines of a busbar are guided very closely to one another, it is ultimately ensured that—at least theoretically—all lines of the busbar can be contacted via rotatable contact elements.

According to the present invention, an electric unit, in particular a luminaire, is thus provided for connecting to a mounting rail, which has an elongated mounting rail profile, which together with two lateral walls encloses a receiving chamber, in which at least one busbar having longitudinally extending, contactable lines is arranged, wherein the lines of the busbar alternately extend in at least two planes aligned parallel to one another and spaced apart, wherein the electric unit according to the invention comprises means for contacting the lines of the busbar, which comprise at least one rotatable contacting element, on whose outer circumference contacts are arranged, which are pivoted outward by rotation of the contacting element and brought into abutment against the lines to be contacted, and wherein, according to the present invention, the means for contacting the lines comprises a first group of contacts as well as a second group of contacts, wherein the contacts of the first group are arranged relative to an axis of rotation of the contacting element such that they are pivoted outward by rotation of the contacting element so as to contact the lines extending in a first plane, and wherein the contacts of the second group are arranged relative to an axis of rotation of the contacting element such that they are pivoted outward by rotation of the contacting element so as to contact the lines extending in a second plane.

In a first variant of the concept according to the invention, it is provided that the two contact groups are arranged on two separate rotatable contacting elements. Because, in particular in the case of a light strip system, the consumers to be connected, which are primarily formed by luminaires, have a certain length, there are usually two rotatable contacting elements in any case in order to enable a reliable mechanical fastening of the luminaire to the mounting rail. Thus far, only one of the contacting elements was actually used in order to contact the lines and comprised corresponding contacts, whereas the second contacting element was provided purely for mechanical interlocking with the mounting rail. According to the present invention, the further contacting element can now also be equipped with contacts, which are however supported, as explained above, in such a way that they can contact different lines than the contacts of the first contacting element.

According to a second variant of the present invention, however, it is also possible to arrange the contacts of the first group and the contacts of the second group on a common rotatable contacting element. In order for both contact groups to be able to contact the respective lines extending in different planes, it is provided that the contacts of the first group have a different distance from the axis of rotation of the contacting element than the contacts of the second group. Further, the contacts of the first group can be arranged offset from the contacts of the second group by an angle relative to the axis of rotation of the contacting element, such that the two contact groups do not collide with one another.

In both variants of the invention, it can be provided that at least one of the contacts is designed to be height-adjustable, for example in order to enable a phase selection. It is then provided that this contact can only occupy positions that correspond to the positions of the respective contact group. By contrast, a continuously variable adjustment of the contact is not desired, because in this case it would not be guaranteed that the contact actually also reliably meets the correspondingly desired line of the busbar.

Further, according to the present invention, a contacting element is proposed for connecting an electric unit to a mounting rail, which has an elongated mounting rail profile, which together with two lateral walls encloses a receiving chamber, in which at least one busbar having longitudinally extending, contactable lines is arranged, wherein the lines of a busbar alternately extend in at least two planes aligned parallel to one another and spaced apart, wherein the contacting element is rotatable and contacts are arranged on its outer circumference, which contacts are pivoted outward by rotation of the contacting element and brought into abutment against the lines to be contacted, and wherein the contacting element comprises a first group of contacts as well as a second group of contacts, wherein the contacts of the first group are arranged relative to an axis of rotation of the contacting element such that they are pivoted outward by rotation of the contacting element so as to contact the lines extending in a first plane, and wherein the contacts of the second group are arranged relative to an axis of rotation of the contacting element such that they are pivoted outward by rotation of the contacting element so as to contact the lines extending in a second plane.

BRIEF DESCRIPTION OF THE DRAWINGS

The invention will be explained in further detail in the following with reference to the accompanying drawing. The figures show.

DETAILED DESCRIPTION

Figure 1:
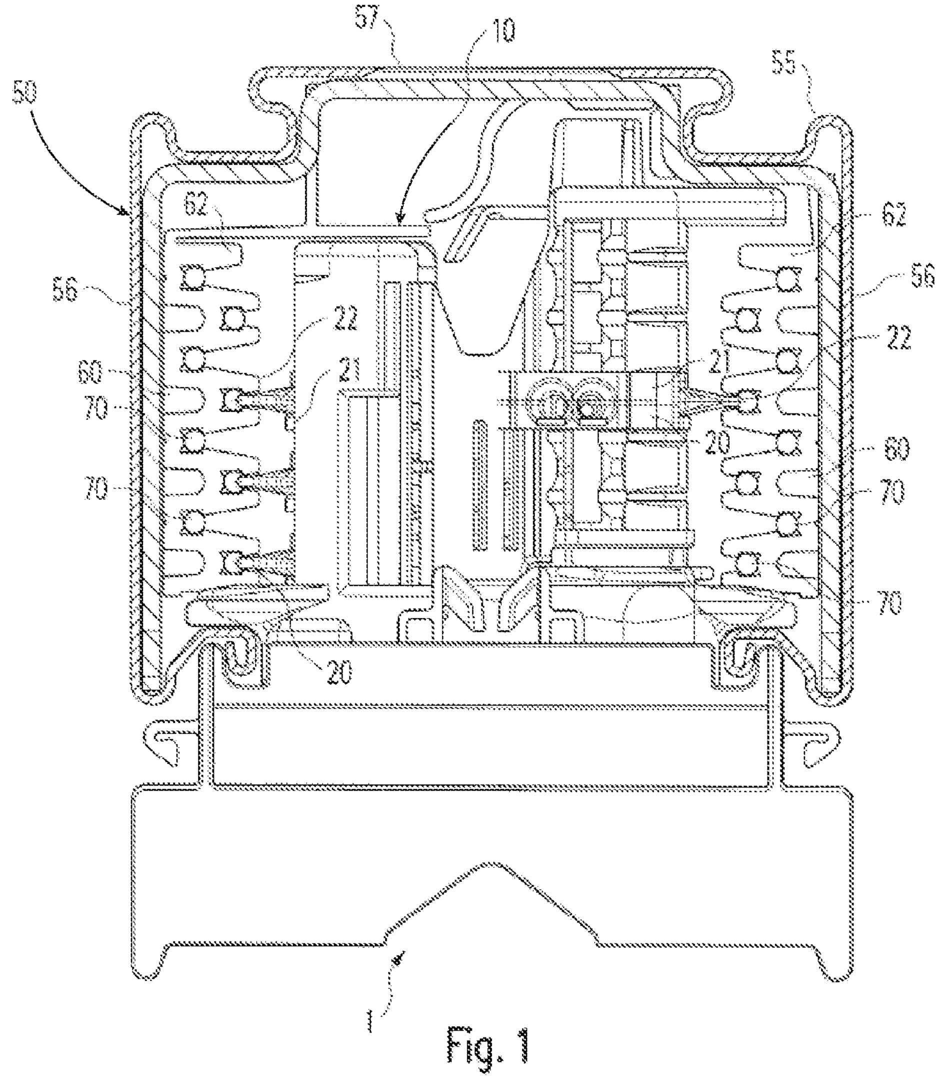
FIG. 1 is a sectional view of a mounting rail of a light strip system having two busbars arranged therein and a luminaire arranged on the mounting rail.
Figure 10:
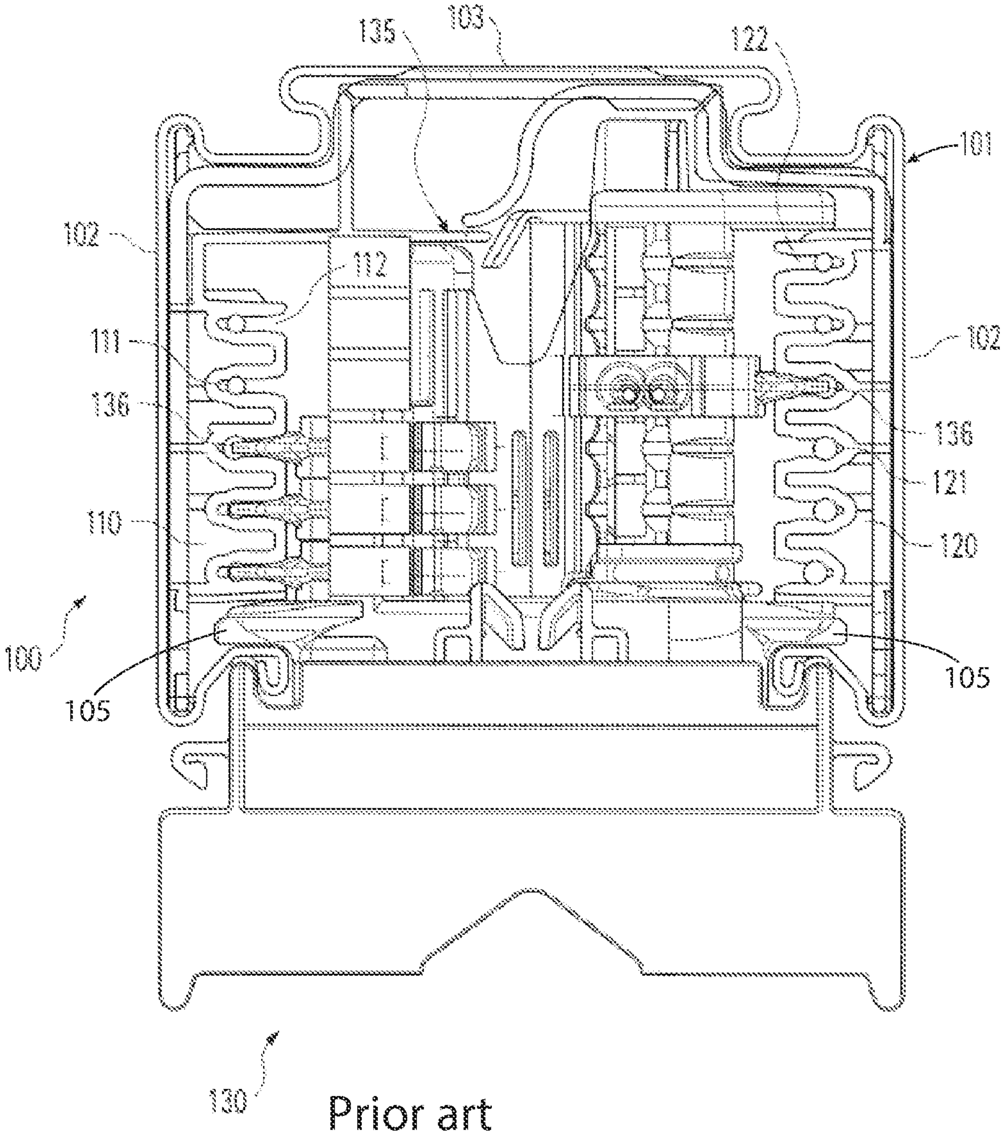
Prior art Fig. 10
FIGS. 10 and 11 are the configuration of a light strip system as well as an associated luminaire according to a solution known from the prior art.
Figure 11:
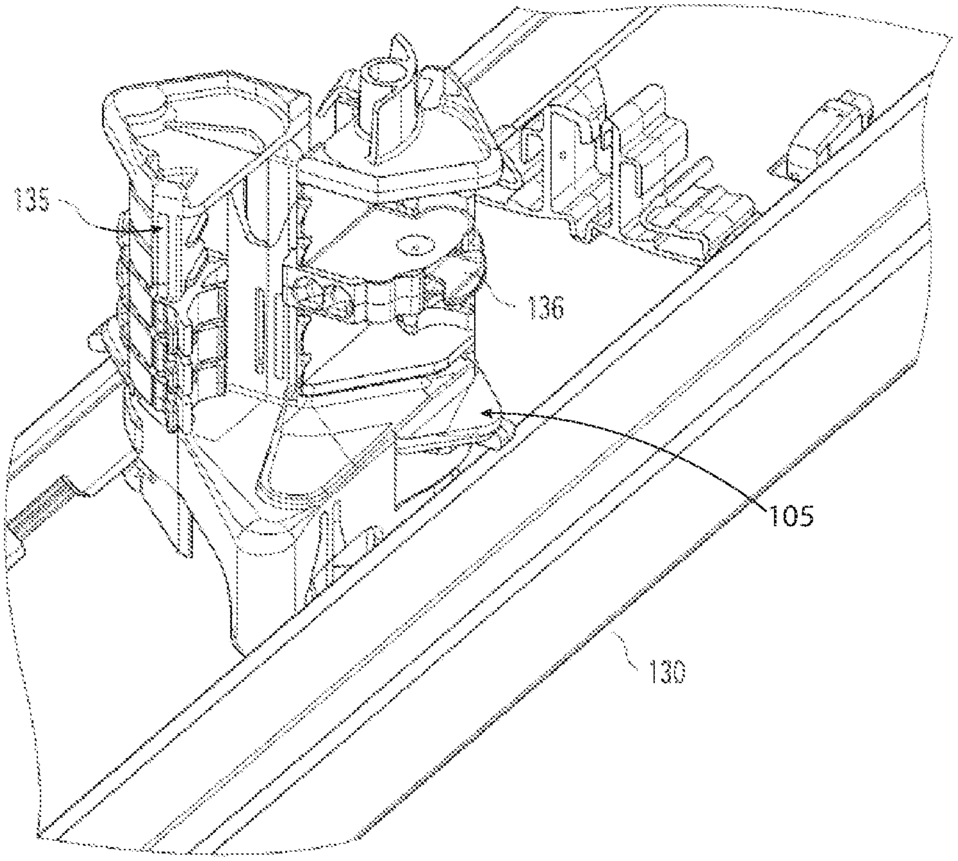
Prior art Fig. 11

The view in FIG. 1 basically corresponds to the view of the prior art according to FIG. 10. Thus, a mounting rail 50 of a light strip system with a luminaire arranged thereon is again shown, but a modified guiding for the lines of the busbars is now provided.

In principle, however, the mounting rail 50 shown in FIG. 1 also initially comprises an elongated mounting rail profile 55, which is approximately U-shaped in cross-section and opens downwards, having two lateral walls 56 and a transverse connecting wall 57, which enclose a receiving chamber that opens towards the bottom. Further, busbars 60 abutting both sides of the receiving chamber on the lateral walls 56 are also provided, each of which comprise a line receiving structure 62, which extends in the longitudinal direction of the mounting rail 50 and is made of an insulating material, comprising elongated channels and grooves in which lines 70 to be contacted are arranged.

A particular feature of the busbars 60 shown in FIG. 1 is that the line receiving structures 62 are designed such that the lines 70 are no longer all arranged in one plane one above the other, as has previously been customary and can be seen in the view in FIG. 10. Rather, there is an alternating arrangement of the lines 70 such that they are alternately arranged in two planes that are spaced apart from one another and extend parallel to one another. These planes can be seen in FIG. 2 and are designated A1, B1 (for the left busbar) and A2 and B2 (for the right busbar).

A first part of the lines 70 of the left busbar 60 thus extends in the plane A1 and thus closer in the region of the associated lateral wall 56 of the mounting rail profile 55, whereas the second part of the lines 70 is arranged in the plane B1, which has a greater distance to the corresponding lateral wall 56. The result of this alternating arrangement of the lines 70 is that, with regard to the distances to be maintained for corresponding creep distances, not only the vertical distance between the lines 70 is to be considered, but also the distance between the two planes A1 and B1 (of course, the same applies to the lines of the right busbar, which are located alternately in planes A2 and B2), such that the number of lines 70 can ultimately be increased overall. A comparison to the view in FIG. 10 shows that the number of lines 70 can now be increased at a comparable height of the busbars 60, 110, 120, which ultimately would lead to an increase in the contacting possibilities for units to be connected to the mounting rail.

Figure 2:
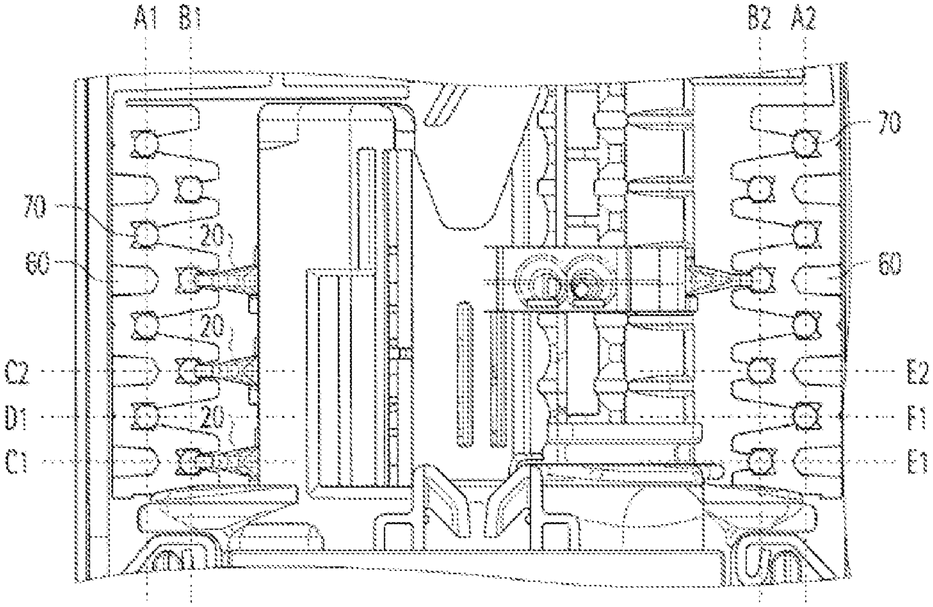
FIG. 2 is a schematic view illustrating the positioning of the lines of the busbars as well as the resulting problems with regard to the contacting of the lines.

However, FIGS. 1 and 2 also show that a merely denser arrangement of the lines 70 of the busbar 60 does not yet mean that a unit to be connected to the mounting rail 50 is actually also able to use the additional contacting possibilities. For this purpose, a luminaire 1 is shown in the figures, the contacting element of which is designed to be comparable to that of the luminaire 130 in FIG. 10. It can be seen that the rotatably supported contacting element 10 in turn has contacts 20 on both sides opposite one another, each comprising an outwardly projecting contact element 22, which is retained by a contact housing 21 consisting of an insulating material.

On the left side, in FIGS. 1 and 2, three contacts 20 overlying one another are shown, which contact lines 70 of the busbar 60 that lie in plane B1. The spacing of these lines 70 to one another in the vertical direction is such that each of these lines 70 can be contacted by a single contact 20 of the luminaire 1 accordingly.

However, it can also be seen that there is no clearance left between two contacts 20 arranged one above the other for a further contact that would be able to contact in plane A1 the line 70 lying between two lines 70 extending in plane B1. The result of this is that the lines 70 designated with positions C1 and C2 are able to be contacted without problems, but not the vertically intermediate line 70 located in position Dl.

Because, due to the superimposed arrangement of the contacts 20 for contacting the lines extending in the plane B1, the space available is already substantially exhausted, no increase in the flexibility in the contacting possibilities can be created by a more compact arrangement of the lines 70 of the busbars 60 alone. Instead, a corresponding further development of the components to be connected to the mounting rail 50 is also required, wherein solutions according to the invention are explained in further detail below.

Figure 5:
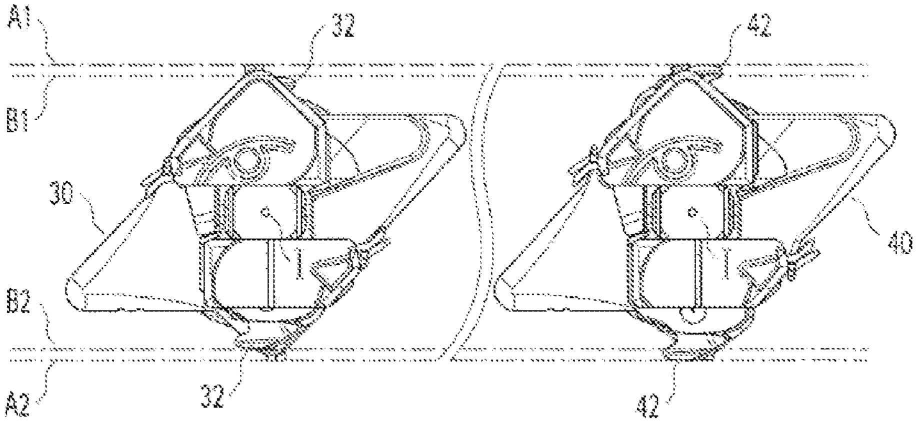
FIG. 5 is an enlarged view of the contacting means of the luminaire of FIGS. 3 and 4.
Figure 3:
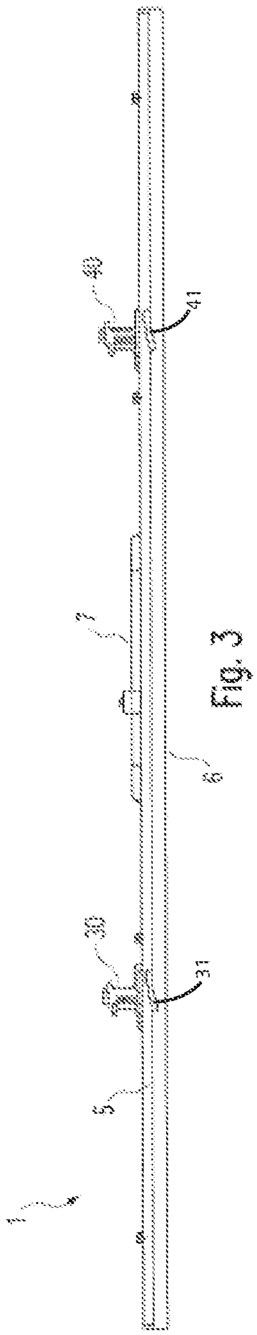
FIGS. 3 and 4 are views of an exemplary embodiment of a luminaire, which is designed with contacting means configured according to the invention.
Figure 4:
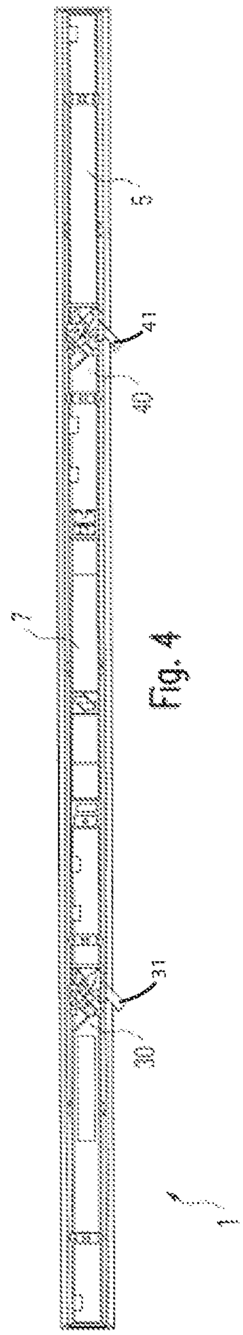

A first embodiment according to the present invention is shown in FIG. 3-6. FIGS. 3 and 4 show views of an elongated bar luminaire, which is to be connected to the mounting rail 50 in the manner shown in FIG. 1 and comprises contacting elements 30 and 40, respectively, which are in turn rotatably supported for this purpose. Rotary toggles 31, 41 turn the contacting elements 31, 41. FIG. 5 shows an enlarged view of the contacting elements 30, 40. These are arranged distributed along the elongated carrier 5 of the luminaire 1, which, for example, serves to mount the illuminant, an optics 6 used for influencing the light output, and an operating device 7 for operating the illuminant.

Thus far, at least two rotatable contacting elements have also generally been provided for a bar luminaire to be connected to a mounting rail in order to enable a mechanical fastening of the luminaire to the mounting rail profile in the longitudinal direction at two positions. Until now, however, only one of the two contacting elements has been used in order to actually contact lines from the busbars.

In the solution according to the invention in FIG. 3-5, on the other hand, it is provided that both contacting elements 30 and 40 now support contacts that are provided for contacting the lines of the busbars 60. However, the two contacting elements 30 and 40 are not identical. Instead, the contacts provided thereon are arranged such that the contacts of a contacting element exclusively comprise lines of one of the two planes A1 and A2, whereas the contacts of the further contacting element contact the lines of the other plane B1 and B2.

This can be seen in FIG. 5, wherein it is shown that the contacts 32 arranged on the left contacting element 30 have internal planes B1 and B2, with respect to the center of the mounting rail, and thus contact the corresponding lines of the busbar, whereas the contacts 42 of the right contacting element 40 contact the outer planes A1 and A2. The contacts 32 of the first contacting element 30 thus form a first contact group in the entirety of all the contacts of the luminaire 1, which group is basically intended to contact lines extending in the inner planes B1 and B2, whereas the contacts 42 of the second contacting element 40 form a second group, which is to contact the lines of planes A1 and A2.

However, as can be seen from FIG. 1, for contacts 70 arranged one on top of the other, which are only to contact lines of a single plane, sufficient space is available so that they can now be arranged one on top of the other without any problems and can contact all lines that run in one plane, analogously to the arrangement of the contacts 20 as shown in FIGS. 1 and 2. Ultimately, this means that by using the second contacting element 40 to mount further electrical contacts 42, there is the possibility to contact all of the lines 70 of the two busbars 60. Thus, when connecting the luminaire 1 to the mounting rail 50, the full circumference of the lines 70 can now be used for contacting, so that there are a variety of possibilities to connect the luminaire 1 to certain phases of the power supply circuits or certain lines for signal transmission.

Preferably, the contacts 32 and 42 of the two contacting elements 30 and 40 of the luminaire 1 shown in FIGS. 3 to 5 are identical in design. The two contact groups differ primarily with respect to their arrangement on the contacting elements 30 and 40. For example, because the contacts 42 of the second contacting element 40 are to contact the lines extending in the more outward lying planes A1 and A2, it is necessary that these contacts 42 have a correspondingly greater distance with respect to the axis of rotation I about which the contacting elements 30, 40 are pivoted than is the case for the contacts 32 of the first contacting element 30. Thus, a corresponding modification with respect to the mounting of the contacts 42 must be made in the second contacting element 40 here. Alternatively, it would generally also be conceivable to extend the contact tabs of these contacts 42 accordingly. Furthermore, the contacts 42 are also positioned slightly offset from the contacts 32 in a vertical direction or in a direction parallel to the pivot axis I, because the height-offset arrangement of the corresponding lines in the two planes A1 and B1 must also be taken into account.

Figure 6:
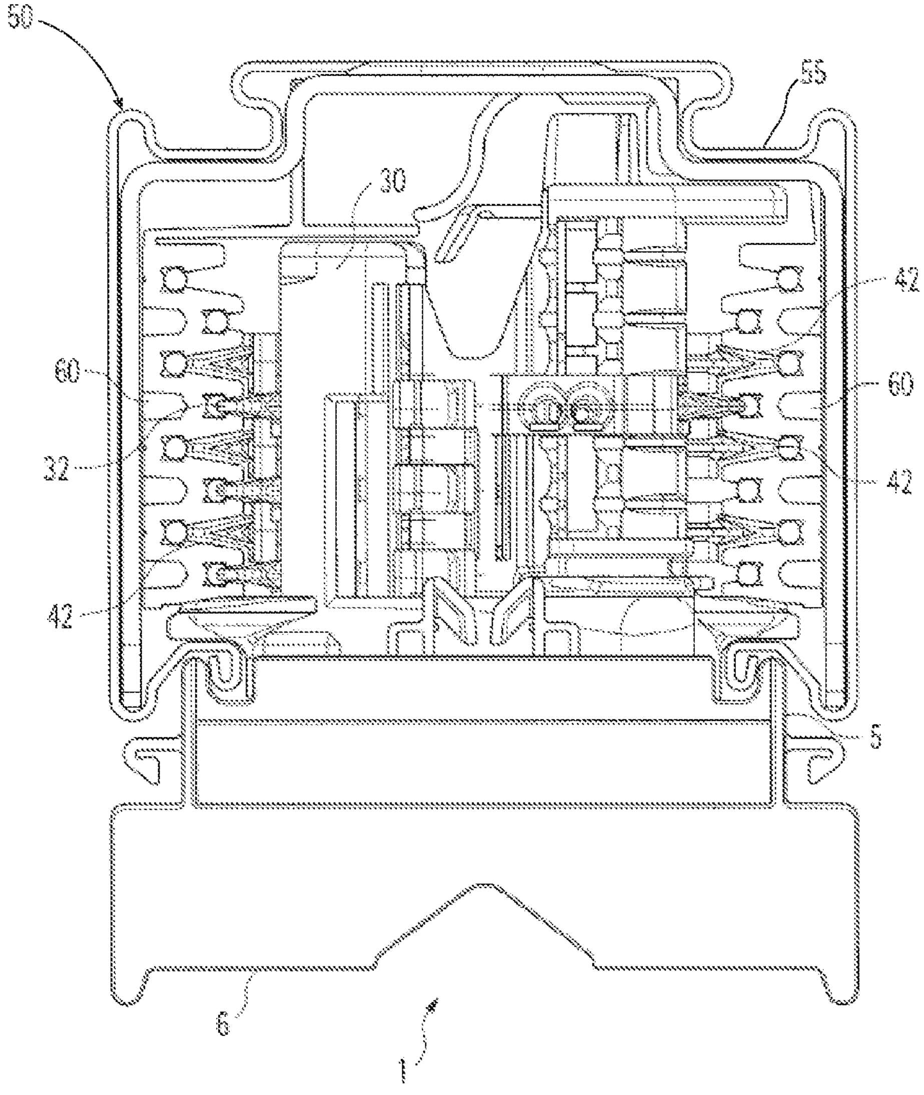
FIG. 6 is a view of the contacting possibilities resulting from the solution according to the invention.

Finally, however, the contacting of busbars can be improved in a relatively simple manner, and in particular the number of lines to be contacted can be increased. As FIG. 6 shows, whose view corresponds to FIG. 1 and in which contacting element 40 that is in the rear when viewed in the longitudinal direction is largely covered by the front contacting element 30, the luminaire 1 can now theoretically contact all of the lines 70 of the two busbars 60.

In the variant shown in FIG. 3-6, the two groups of the contacts 32, 42 formed according to the invention are arranged on different contacting elements 30, 40, respectively. However, this need not necessarily be the case, as explained below with reference to FIG. 7-9, which show a second exemplary embodiment of a corresponding contacting element 51, 51A according to the invention.

Figure 7:
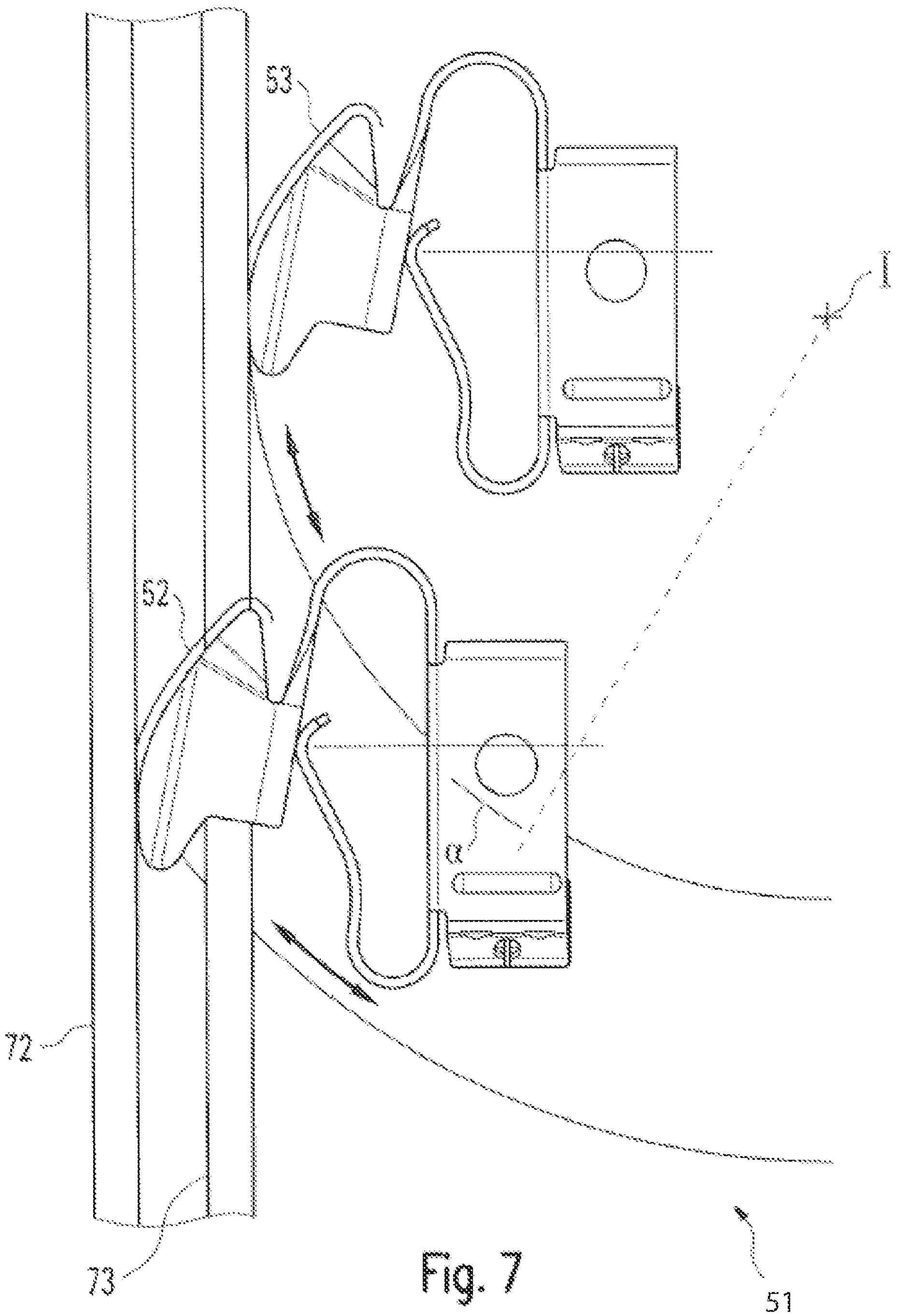
FIG. 7 is a detailed view of the arrangement according to the invention of two contact groups on a common contacting element.

FIG. 7 shows the top plan view of a subregion of a contacting element 51, which in the illustration carries two contacts 52 and 53, which are to respectively contact two lines 72 and 73 offset from one another. The two lines 72 and 73 are not only arranged side-by-side in the illustrated drawing plane, but also have an offset in a direction perpendicular thereto, as explained in FIGS. 1 and 2. The line 72 thus corresponds to a line extending in plane A1, whereas the line 73 extends in plane B1. Likewise, the corresponding contacts 52 and 53 are also arranged at different heights on the contacting element 51.

FIG. 7 shows the arrangement in the outwardly pivoted state of the contacting element 51, in which the contacts 52 and 53 thus touch the respective lines 72 and 73. It can be seen that a contacting of the lines 72, 73 can respectively be achieved in a reliable manner, because the contacts 52, 53 are supported on the contacting element 51 such that they are actually also brought into abutment against the corresponding lines 72, 73. In particular, this means that the contact 52 to be contacted by the outer line 72 has a greater distance with respect to the axis of rotation I about which the contacting element 51 is pivoted than the contact 53 provided for contacting the more inward line 73. Furthermore, both contacts 52, 53 are also arranged offset by an angle with respect to this axis of rotation I on the contacting element 51, so that they have a sufficient distance to one another, both vertically and in particular horizontally. Again, according to the arrangement of the contact 52, there is the possibility of arranging a plurality of similarly positioned contacts of this contact group one above the other in order to contact the overlain lines located in plane A1, the same being true for contact 53, which is then to contact the lines of plane B1 with correspondingly positioned contacts. Thus, two groups of contacts are arranged on the contacting element 51, which are each designed to contact the lines of the busbar in one plane.

It can also be seen in FIG. 7 that it is at least necessary for the contacts of one of the two contact groups that they be arranged somewhat pivoted with respect to a radial axis extending from the axis of rotation. This can be seen in FIG. 7, in particular for the contacts 52 of the first group. While the contacts 53 lying approximately at the height of the axis of rotation I are oriented substantially radially outward, the contacts 52 of the first group with a radial axis extending from the axis of rotation form an angle $\alpha$. This takes into account that the contacts of the first group 52 do not touch the lines at the height of the axis of rotation I when viewed in the longitudinal direction, but rather offset therefrom, wherein, despite everything, an optimal connection of the lines 72, 73 is present.

Figure 8:
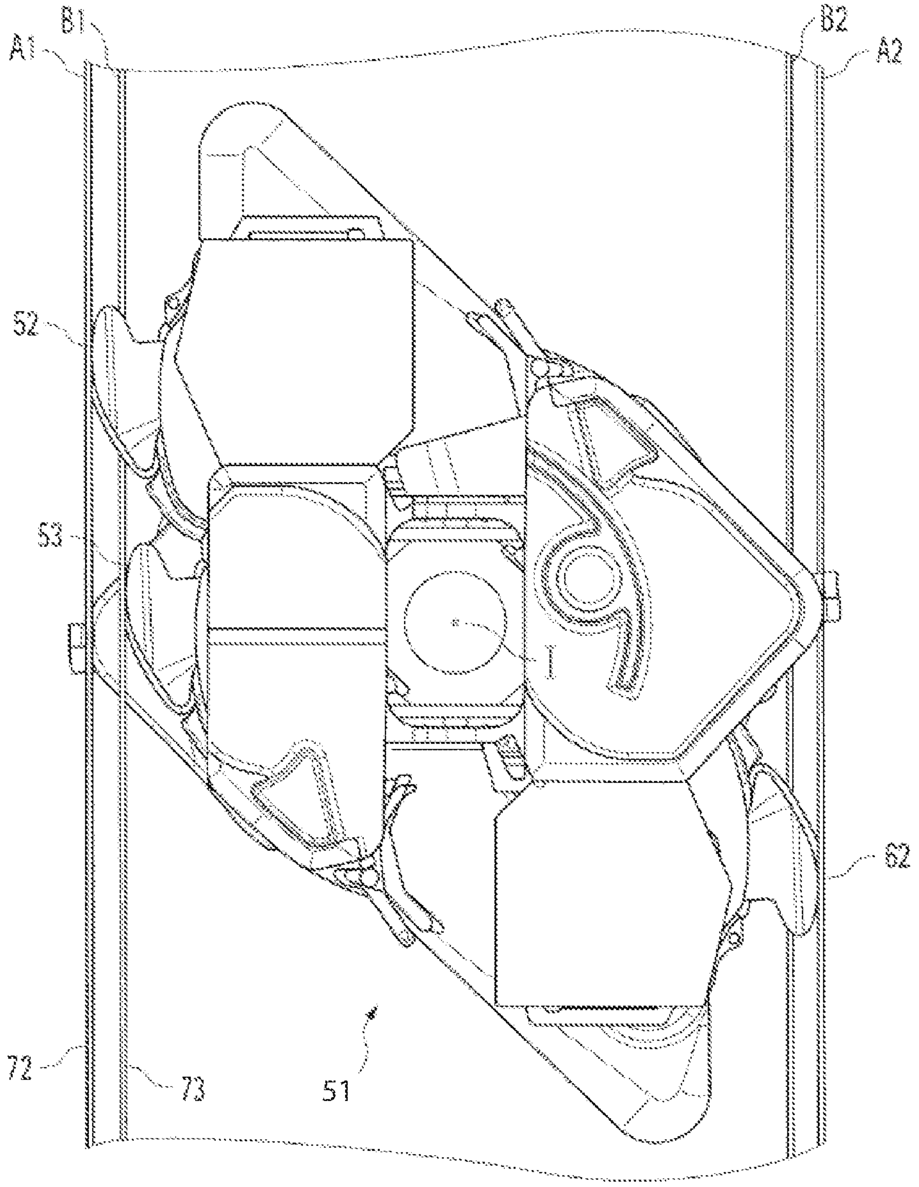
FIGS. 8 and 9 are views of two different variants of a contacting element designed according to the invention.

FIG. 8 shows a top plan view of a complete contacting element 51, which is designed as explained in FIG. 7. In this respect, further contacts 62, 63 are provided respectively opposite to the contacts 52, 53, which are provided in an analogous manner for contacting the opposite lines of the second busbar extending in planes A2 and B2. Ultimately, this contacting element 51 is thus theoretically at least able to contact all lines of the busbars arranged on both sides.

Figure 9:
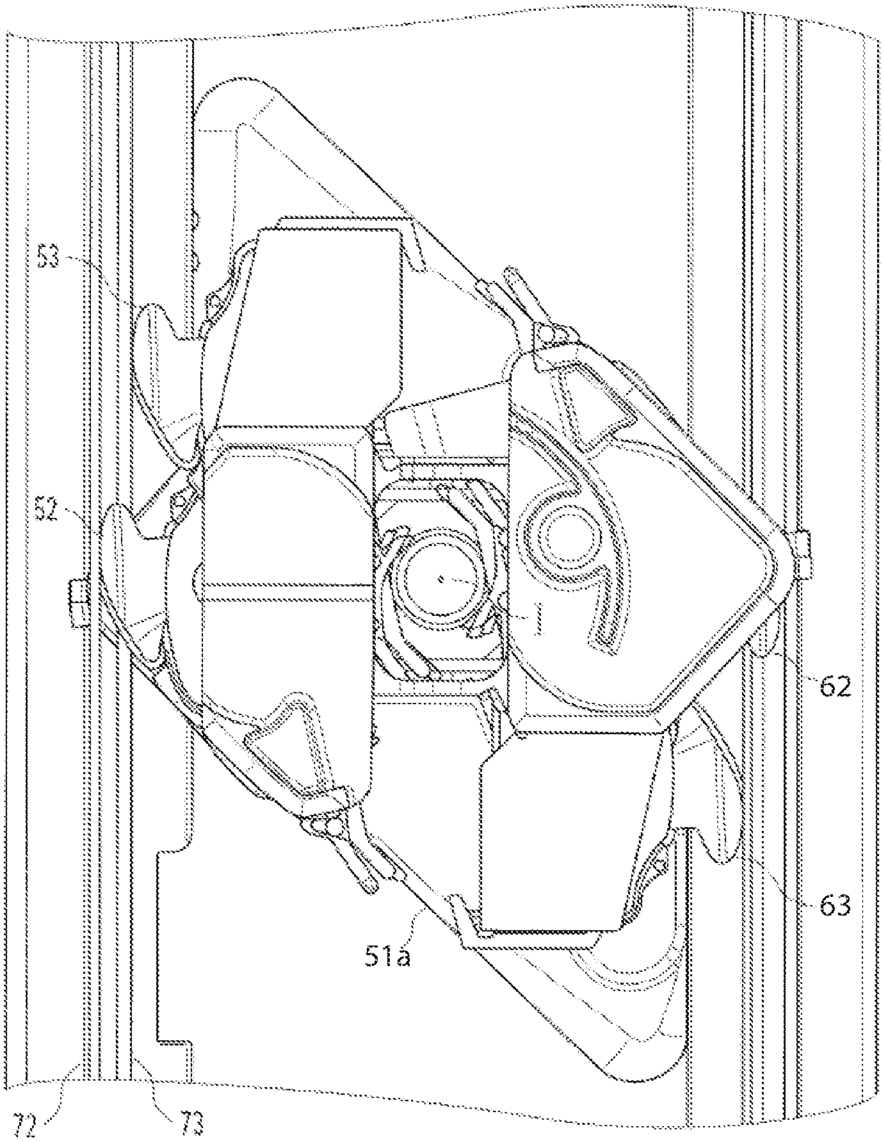

FIG. 9 shows a slightly modified embodiment in comparison to the variant shown in FIG. 8. The difference is that, in the contacting state shown, the outer contacts 52 and 62 lie approximately even with the axis of rotation I, when viewed in FIG. 9. However, the variant shown in FIGS. 7 and 8 is preferable, in which the inner contact 53 and the contacts of this corresponding group lie even with the axis of rotation I, respectively. Namely, this arrangement results in the contacting element 51A needing to be less strongly deflected in order to interlock or unlock. It can certainly also be provided that the axis of rotation is slightly beyond the so-called “dead center,” which ultimately results in the contacts 52, 53, 62, 63 pushing against the surfaces of the lines to be contacted with a somewhat stronger force.

The configurations of the contacting elements according to the invention thus allow that, even in the case of a very compact arrangement of the lines in a busbar, there is theoretically at least the possibility of contacting all lines. In reality, however, a somewhat smaller number of contacts will be selected, wherein some of the contacts are mounted in a height-adjustable manner or can be arranged at different heights on the contacting element in order to select which lines of the busbar are to actually be contacted. As a result, a so-called phase selection can be carried out, or it can be determined via which lines selected for communication a consumer to be connected can communicate with, for example, a control panel of the system.

It would be advantageous in this situation for the respectively selectable lines or phases of the power supply circuit of a busbar are respectively gathered in one plane. In this way, the corresponding phase selection can then be realized in the manner already known, namely by having a corresponding contact slidably mounted on the corresponding contacting element. However, the contact can only occupy positions assigned to the respective group, so that it is only guaranteed that it contacts the lines extending in a certain plane, regardless of its position.

Overall, this creates the possibility of making the contacting of busbars even more flexible. This results in a wide range of possibilities for expanding bus bar systems or, generally, light strip systems in terms of their functionality. Furthermore, with a consistent number of lines through a more compact arrangement of the lines, it is possible to make the light strip system flatter overall. An implementation of light strip systems with more lines having the same design size is also possible.

The invention claimed is:

1. An electric unit, comprising a luminaire (1), which is provided for connecting to a mounting rail (50) having an elongated mounting rail profile (55), which together with two lateral walls (56) encloses a receiving chamber, in which at least one busbar (60) having longitudinally extending, contactable lines (70) is arranged, wherein the lines (70) of a busbar extend alternately in at least two planes that are aligned parallel to one another and spaced apart from one another (A1, B1), wherein the electric unit comprises means for contacting the lines (70) of the busbar (60), said means comprising at least one rotatable contacting element (30, 40), on the outer circumference of which are arranged contacts (32, 42), which are pivoted outwardly when the contacting element (30, 40) is rotated and brought into abutment against the lines (70) to be contacted, wherein said means for contacting the lines of the busbar comprises a first group of contacts (32) as well as a second group of contacts (42), wherein the contacts of the first group are arranged with respect to an axis of rotation (I) of the contacting element (30) such that they are pivoted outwardly when the contacting element (30) is rotated such that they contact the lines (70) extending in a first plane (A1), wherein the contacts of the second group are arranged with respect to an axis of rotation (I) of the contacting element (4040) such that they are pivoted outwardly when the contacting element (4040) is rotated such that they contact the lines extending in a second plane (B1), and wherein the contacts of the first group (32) are arranged on a first contacting element (30) and the contacts of the second group (42) are arranged on a second contacting element (40), and the first contacting element (30) and the second contacting element (40) are arranged longitudinally spaced apart from one another on a supporting element (5) of the unit.

2. The electric unit according to claim 1, wherein the contacts of the first group have a greater distance from the axis of rotation (I) of the contacting element (30, 40, 51, 51A) than the contacts of the second group.

3. The electric unit according to claim 1, wherein at least one of the contacts (32, 43) is supported on the contacting element (30, 40) in a height-adjustable manner, wherein said contact can only occupy positions corresponding to one of the two groups.

4. The electric unit according to claim 1, the contacting element (30, 40) has contacts opposite to one another with respect to its axis of rotation, which are designed to contact two busbars arranged on both sides of the contacting element (30, 40).

5. The electric unit according to claim 1, wherein the electric unit is a bar luminaire.

6. A contacting element for connecting an electric unit to a mounting rail (50) comprising an elongated mounting rail profile (55) that along with two lateral walls (56) encloses a receiving chamber, in which at least one busbar (60) with longitudinally extending, contactable lines (70) is arranged, wherein the lines (70) of a busbar extend alternately in a first and a second plane (A1, B1) that are aligned parallel to one another and are spaced apart from one another on each side of the mounting rail profile, and there are at least three busbar lines in each plane on each side of the mounting rail profile, wherein the contacting element (51, 51A) is rotatable with respect to an axis of rotation (I), and contacts (52, 53, 62, 63) are arranged on the outer circumference of the contacting element, which contacts are moved in an arc by rotating the contacting element (51, 51A) with respect to the axis of rotation (I) and brought into abutment with the lines (70) to be contacted, wherein the contacting element (51, 51A) comprises a first group of contacts (52, 62) as well as a second group of contacts (53, 63), wherein the contacts of the first group are arranged with respect to the axis of rotation (I) of the contacting element (51, 51A) such that they contact the lines (70) extending in the first plane (A1) when moved in an arc by rotating the contacting element (51, 51A), and wherein the contacts of the second group are arranged with respect to the axis of rotation (I) of the contacting element (51, 51A) such that they contact the lines extending in the second plane (B1) when moved in an arc by rotating the contacting element (51, 51A);

wherein the contacts of the first group have a greater distance from the axis of rotation (I) of the contacting element (50) than the contacts of the second group and the contacts of the first group are arranged offset from the contacts of the second group by an angle relative to the axis of rotation (I) of the contacting element (51, 51A) with such that the contacts in the first group are capable of contacting busbar lines in the first plane when contacts in the second group contact busbar lines in the second plane.

7. The contacting element according to claim 6, wherein at least one of the contacts (52, 53, 62, 63) is supported on the contacting element (51, 51A) in a height-adjustable manner, wherein said height-adjustable contact can only occupy positions corresponding to one of the two groups.

* * * * *